Figure 1:
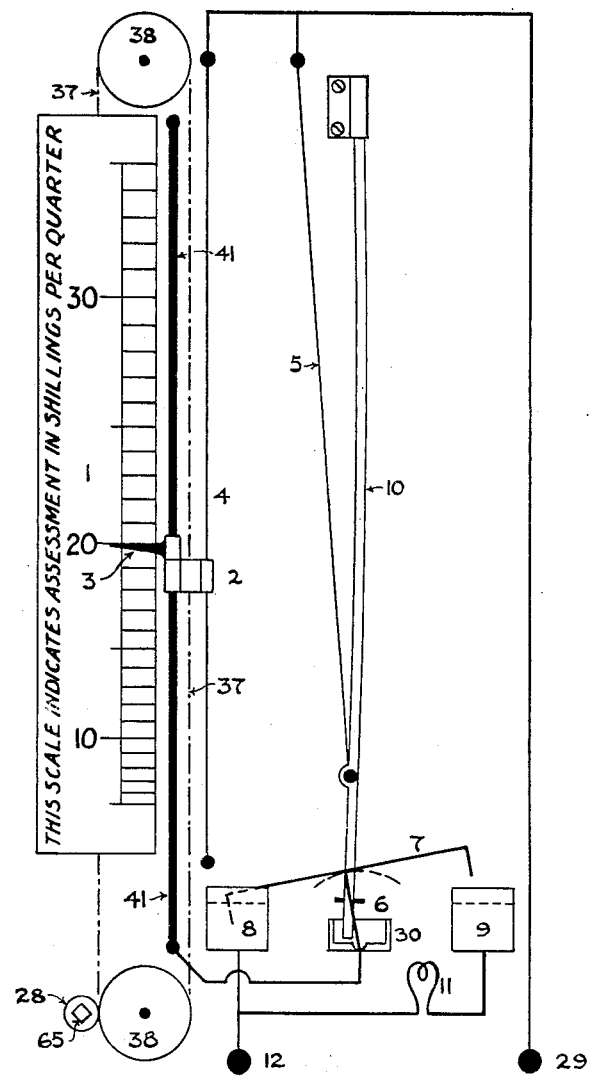

UNITED STATES PATENT OFFICE.

ETHELBERT THOMAS RUTHVEN MURRAY, OF RADLETT, ENGLAND.

APPARATUS FOR INDICATING A FAIR CHARGE FOR ELECTRICAL CURRENT CONSUMED.

1,121,121.  Specification of Letters Patent.  Patented Dec. 15, 1914.

Application filed December 10, 1910. Serial No. 596,668.

*To all whom it may concern:*

Be it known that I, ETHELBERT THOMAS RUTHVEN MURRAY, of The Eyrie, Radlett, Hertfordshire, England, have invented a new and useful Improvement in Apparatus for Indicating a Fair Charge for Electrical Current Consumed, of which the following is a specification.

My invention relates to improvements in apparatus for indicating a fair charge for electrical current supplied designed to enable charges for the supply of electricity to be made upon a more simple and equitable plan than those heretofore used. With this object in view, it is necessary to know the rate at which a consumer takes his supply, or the amount of the demand, since the maximum demand he makes on the suppliers determines, to a large extent, the capital which must be expended to afford him the supply. The charges upon this capital, together with all expenses necessary to keep the suppliers in a position to afford the supply, are known as stand-by or standing charges; and the costs of generating the energy supplied are known as running costs.

In the most perfect form of my assessment system and one which would be used for very large consumers, I take an ordinary meter which measures the total amount of electrical energy consumed in a quarter, assuming this is to be the period of time for which bills are sent in. The rate in money for which the consumer will be charged on this instrument will be less, in fact considerably less, than is charged by companies which base their entire charge on the ordinary meter alone. In addition there will appear in the quarterly account a charge which is read from the maximum-demand meter. This maximum-demand meter operates as follows: If the consumer does not think he is going to use more than twenty lamps, say, at any one time during the quarter, he sets the pointer at a mark corresponding to a maximum demand of twenty lamps. The scale, however, is calculated in money values and not in lamps. If the consumer throws twenty-one lamps into circuit at any one time, his lamps will be made to flicker by the maximum-demand meter. He must therefore put out a lamp or throw his scale on the maximum-demand meter to a higher point. But so far as the assessmeter is concerned, the amount which will figure in his bill will be the same whether the consumer burns twenty lamps for five minutes or for the entire quarter. The consumer's bill, in fact, will be made up of two items one read from the meter which registers the total amount of electrical energy consumed quarterly, at the low rate which my system of metering makes possible, plus the number of shillings read off from the maximum-demand meter. In this way the consumer will pay an amount part of which corresponds to the running costs and part of which corresponds to the standing charges due to the capitalization account, the latter being determined by his maximum demand, as it should be. In this way, the consumer will pay a fairer rate as against his fellow consumers and one more closely corresponding to the just demands of those who have invested their capital in the enterprise of supplying him with current.

With ordinary customers who do not use a great deal of current, the first meter above mentioned, that which registers the total amount of electrical energy consumed in the quarter, may be dispensed with and the customer will be charged as if he used the maximum amount of current for a certain number of hours, say three hours, each day. In this case the maximum-demand meter will remain exactly as it now is except that there will be added to each of the numbers now on the scale a correspondingly higher figure representing the money charge for a supposedly normal use of so much current per quarter, say a use of three hours per day. Instead of having two separate meters with two scales, there will, in this case, be a single meter with a scale summatively calibrated upon two principles of charge.

My instruments may be constructed so that by means of a special loose or removable key provided, the consumer may fix his own assessment; but when once fixed he cannot reduce it, nor would it be reduced unless a general alteration in the scaling of the instruments were made by the suppliers. If, however, the consumer desires to increase the number of lamps, or other consuming devices, he wishes to use simultaneously, and so increase the maximum supply he may demand, then he can raise his assessment as will be hereinafter explained. An interfering device is provided whereby should he endeavor to obtain more electricity than the maximum allowed him under the setting of the instrument his supply is caused to be cut off, or the pressure to be reduced intermittently or for a time or a defective supply to be given otherwise so that his lamps will fail to give a proper light or his other apparatus to give a proper effect.

Any visible or audible means may be provided to give warning that the fixed maximum is being exceeded in so persistent and troublesome a manner as to make the use of the lamps uncomfortable, in which case the visible or audible means is also an interfering device. The consumer can then either reduce his demand or increase his assessment. Then another feature of my instrument is that the consumer may at any time reduce the demand at which the instrument will annunciate and so set a limit on the energy which can be consumed in a given period. Although the assessment cannot be reduced the consumption of energy may be varied at will.

In order that the scope of my invention may be more readily understood I shall proceed to describe, by way of types or examples, certain forms thereof.

Figures 2, 3:
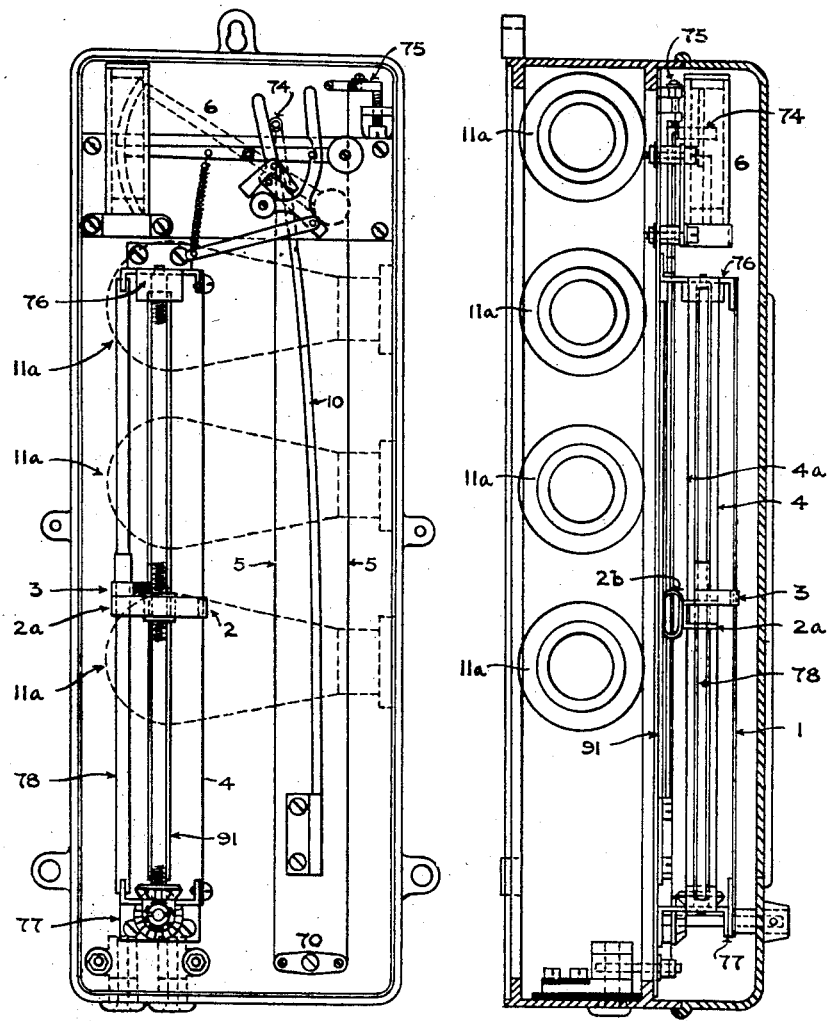

Figure 1 shows one form of my invention. Figs. 2 and 3 show a more concrete embodiment of my invention.

In the first of these forms I rely upon the expansion and contraction of what is known as a "hot wire," its action being similar to that in the form of voltmeter known as the "hot wire voltmeter." In my instrument I employ a scale which may be marked for example "20/- per quarter." Now let us assume that a consumer is to be allowed to use any amount of current up to a certain limit let us say that for which he would be charged at the rate of 20/- per quarter. By means of a special key a traveling contact piece or traveling device abutting against a loose index or pointer is caused to travel over a resistance and move the said index until it points to the indication 20 upon the scale. In parallel with this resistance is the hot wire already mentioned and this hot wire acts upon a switch, such for example as one of the well known forms having a rocking lever whose extremities dip into mercury cups, in such manner that when the proportion of the current which the consumer is taking and which proportion passes through the hot wire is such as to cause sufficient expansion thereof a spring or lever or other device connected with the hot wire will cause the said switch arm to rock and break circuit at one point and make it at another through a second resistance hereinafter termed the "dimming resistance." The result of the interposition of this dimming resistance is to cause the consumer's lamps to give less light or any other consuming device that he may be using to be less effective and thus announce to him the necessity of switching off one or more of his lamps or otherwise consuming less current. Immediately after such dimming effect however less current will flow through the hot wire because it is now in series with the dimming resistance and it will contract and the switch will be rocked in the opposite direction until contact be made as at first. The dimming resistance is now cut out of circuit again, the hot wire re-heated, that is to say more intensely heated, and the cycle of operations will take place as before. The irritating effect of this "blinking" operation will induce the consumer, if he has not already switched off some current, to increase his allowance which can be done by again applying the special key to the squared end 65 (see Fig. 1) and moving the traveling contact and pointer until the latter points to some higher assessment, say 25/- per quarter. This form of my invention is illustrated in Fig. 1 of the accompanying drawings in which 1 is the scale, 2 the traveling contact piece, 3 the index against which the said traveling contact piece abuts, 4 the resistance, 5 the hot wire, 6 the switch, 7 the rocking lever, 8 and 9 the mercury cups, 10 the spring or lever connected with the hot wire and 11 the dimming resistance. The instrument in this case is illustrated with the parts in the positions which they occupy when no current is passing or when the current is within the limit for which the instrument is set. In this position current passes from main terminal 12 to mercury cup 8, thence through the switch arm 7 of switch 6 into the mercury cup 30 into which the end of spring 10 dips. From this point the current divides part passing through hot wire 5 to main terminal 29 and part passing through slide wire 41 to the traveling contact piece 2 and thence through part of resistance 4 to the said second main terminal 29. If now the current increases beyond the limit for which the instrument is set the increased heating of the hot wire 5 will cause it to expand to a sufficient extent to throw over the switch 6 so that contact will be broken at 8 and made at 9. The current instead of now passing directly from main terminal 12 through mercury cup 8 to switch 6 will now pass from the said terminal through dimming resistance 11 and mercury cup 9 to the said switch. This will reduce the current flowing in the circuit and will cause the consumer's lamps to give less light or his other consuming devices to be less effective so as to announce to him the necessity of reducing his current consumption or of increasing his assessment. The circuit being now through the dimming resistance and less current flowing the hot wire 5 will cool and contract and will draw the switch back into the position illustrated 5 and the cycle of operations will be repeated thus causing blinking as hereinbefore described. The traveling contact 2 is attached to a cord or chain 37 passing over pulleys 38 by means of which the consumer by rotating the pinion 28 with the aid of the special key may increase his assessment if desired.

It will be seen that the consumer may at any time vary the demand at which the instrument will annunciate. Thus should he wish it to annunciate at a demand lower than that corresponding with the position of his loose index he has merely to insert his key on the squared end 65 and turn it so as to lower the traveling device. In so doing however he does not reduce his assessment.

In Figs. 2 and 3, I illustrate my invention as embodied in a more concrete form of instrument, Fig. 2 being a front view with the front of the case of the instrument and the scale removed and Fig. 3 being a side view with the side of the case removed. The instrument illustrated in these figures differs only in minor details from that previously described. In this form the diverting resistance embraces two resistance wires 4 and 4$^a$ (see Fig. 3) which lie in a vertical plane normal to the back of the instrument and which are bridged by traveling contact 2. Integral with the traveling contact 2 but insulated therefrom is a part 2$^a$ which makes contact with a slide wire 78 and which also carries a spring contact 2$^b$ which bears against a contact plate 91 which is connected with the dimming resistance. The part 2$^a$ further serves to move the resting pointer 3 on the assessment being increased. The scale 1 is shown in edge view in Fig. 3 but is absent from Fig. 2. It is attached at its upper and lower ends to brackets 76 and 77 respectively.

75 is a device by means of which the hot wire 5 may be flexibly adjusted. The dimming resistance in this instrument takes the form of a number of incandescent lamps 11$^a$. The various electrical connections are not shown in these two figures as these are intended merely to show the parts of an actual instrument constructed in accordance with my invention. Such electrical connections will however be readily understood from the description of Fig. 1 of the drawings.

In the form of instrument illustrated in these figures the dimming resistance consists of carbon filament incandescent lamps and as is well known the resistance in the case of such lamps decreases with increase of current and consequent increase of temperature. It is therefore unnecessary in this case to provide any mechanical device for decreasing the dimming resistance on increasing the assessment.

I have described how the consuming device, whether it be a lamp or a motor or the like, may be caused to operate ineffectively, as by becoming dim or by blinking or otherwise and this is the preferable way of interfering with the consumer's consumption when he exceeds the maximum demand for which his instrument is set. It is obvious, however, that I might interfere with the consumer's quiet consumption, when he has exceeded his maximum demand, in any other suitable way so that the customer would cut down his current below his scaled maximum or else increase his assessment by properly moving the pointer. The term interfering device, as employed by me, is therefore broad enough to include devices which interfere with the quiet and proper enjoyment of current by the consumer whether such interference is direct or indirect.

I may say in conclusion that I have shown merely one form of interfering device operating by the expansion and contraction of a wire but that many other forms of interfering device operating upon a variety of different principles might be substituted therefor. I prefer to show what I consider to be the best form of my invention and not to load my specification down with a number of equivalent forms, all of which would be obvious to the skilled electrician once he had understood the generic principles of my invention.

Having thus described my invention what I claim as new and desire to secure by Letters Patent is:—

1. An apparatus for indicating a fair charge for electrical current supplied comprising an instrument scaled to indicate a charge corresponding to the current consumed; a movable index adapted to travel over a scale, calibrated to indicate a charge which varies as the maximum demand varies but, once set, does not change under variation of current supply; and an interfering device thrown into operation when the maximum demand is exceeded substantially as described.

2. An apparatus for indicating a fair charge for electrical current supplied comprising an instrument scaled to indicate a charge corresponding to the current consumed; a movable index adapted to travel over a scale, calibrated to indicate a charge which varies as the maximum demand varies, but, once set, does not change under variation of current supply; a device capable of being moved in either direction but moving the index in only one direction; and an interfering device thrown into operation when the maximum demand is exceeded substantially as described.

3. An apparatus for indicating a fair charge for electrical current supplied comprising an electrical meter scaled to indicate a charge corresponding to the current consumed; an instrument having a movable index adapted to travel over a scale, calibrated to indicate a charge which varies as the maximum demand varies but, once set, does not change under variation of current supply; and an interfering device thrown into operation when the maximum demand is exceeded substantially as described.

In witness whereof I have signed my name to this specification in the presence of two subscribing witnesses.

ETHELBERT THOMAS RUTHVEN MURRAY.

Witnesses:
 RIPLEY WILSON,
 CLARENCE P. LIDDON.